US012717192B2

(12) United States Patent
Shiraishi et al.

(10) Patent No.: US 12,717,192 B2
(45) Date of Patent: Aug. 25, 2026

(54) LIGHT CONTROL SHEET

(71) Applicant: TOPPAN HOLDINGS INC., Tokyo (JP)

(72) Inventors: Ryuji Shiraishi, Taito-ku (JP); Takashi Oonishi, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/914,880

(22) Filed: Oct. 14, 2024

(65) Prior Publication Data

US 2025/0035994 A1 Jan. 30, 2025

Related U.S. Application Data

(63) Continuation of application No. PCT/JP2023/015022, filed on Apr. 13, 2023.

(30) Foreign Application Priority Data

Apr. 14, 2022 (JP) ................................ 2022-066695

(51) Int. Cl.
*G02F 1/1343* (2006.01)
*G02F 1/1345* (2006.01)
*G02F 1/1347* (2006.01)

(52) U.S. Cl.
CPC ...... *G02F 1/13439* (2013.01); *G02F 1/13452* (2013.01); *G02F 1/13471* (2013.01)

(58) Field of Classification Search
CPC ............ G02F 1/13439; G02F 1/13452; G02F 1/13471
See application file for complete search history.

(56) References Cited

U.S. PATENT DOCUMENTS

2016/0033841 A1 2/2016 Gauthier et al.
2021/0208321 A1 7/2021 Takahashi
2021/0373392 A1 12/2021 Nie et al.

FOREIGN PATENT DOCUMENTS

JP 2016-509264 A 3/2016
JP 2020-177039 A 10/2020
JP 2021-532408 A 11/2021

OTHER PUBLICATIONS

International Search Report issued Jun. 27, 2023 in PCT/JP2023/015022, filed Apr. 13, 2023, with English translation, 5 pages.

(Continued)

*Primary Examiner* — Lucy P Chien
(74) *Attorney, Agent, or Firm* — Oblon, McClelland, Maier & Neustadt, L.L.P.

(57) ABSTRACT

A light control sheet includes a first electrode sheet including a first transparent electrode layer, a second electrode sheet including a second transparent electrode layer, and a light control layer. The first sheet, second sheet, and control layer form a driver section in which the first sheet, second sheet, and control layer are overlaid, a first non-driver section in which the first sheet is exposed from the control layer and second sheet, and a second non-driver section in which the second sheet is exposed from the control layer and first sheet. The non-driver sections have a sealing section covering end face of the control layer. The first electrode layer includes a non-conductive section in the first non-driver section. The non-conductive section is not connected to a first driver portion in the driver section. The first non-driver section includes a disconnection section separating the non-conductive section from the first driver portion.

12 Claims, 9 Drawing Sheets

(56) References Cited

OTHER PUBLICATIONS

Extended European Search Report issued Jul. 22, 2025 in European Patent Application No. 23788394.7, 10 pages.

LIGHT CONTROL SHEET

CROSS-REFERENCE TO RELATED APPLICATIONS

The present application is a continuation of and claims the benefit of priority to International Application No. PCT/JP2023/015022, filed Apr. 13, 2023, which is based upon and claims the benefit of priority to Japanese Application No. 2022-066695, filed Apr. 14, 2022. The entire contents of these applications are incorporated herein by reference.

BACKGROUND OF THE INVENTION

Field of the Invention

The present invention relates to a light control sheet including a light control layer between a first electrode sheet and a second electrode sheet. The light control layer includes a liquid crystal composition.

Description of Background Art

JP 2020-177039 A describes a light control sheet including a pair of electrode sheets and a light control layer positioned between the pair of electrode sheets. The entire contents of this publication are incorporated herein by reference.

SUMMARY OF THE INVENTION

According to one aspect of the present invention, a light control sheet includes a first electrode sheet including a first transparent substrate and a first transparent electrode layer, a second electrode sheet including a second transparent substrate and a second transparent electrode layer, and a light control layer including a liquid crystal composition and formed between the first transparent electrode layer and the second transparent electrode layer. The first electrode sheet, the second electrode sheet, and the light control layer form a driver section in which the first electrode sheet, the second electrode sheet, and the light control layer are overlaid, a first non-driver section in which the first electrode sheet is exposed from the light control layer and the second electrode sheet, and a second non-driver section in which the second electrode sheet that is exposed from the light control layer and the first electrode sheet, the first non-driver section and the second non-driver section has a sealing section covering an end face of the light control layer, the first transparent electrode layer includes a first terminal and a non-conductive section in the first non-driver section such that the first terminal is electrically connected to a first driver portion positioned in the driver section and that the non-conductive section is not electrically connected to the first driver portion, the first non-driver section includes a disconnection section separating the non-conductive section from the first driver portion and the first terminal, the non-conductive section forms an outer peripheral end face of the light control sheet, and the second non-driver section includes a second terminal that is electrically connected to a second driver portion of the second transparent electrode layer in the driver section.

According to another aspect of the present invention, a light control sheet includes a first electrode sheet including a first transparent substrate and a first transparent electrode layer, a second electrode sheet including a second transparent substrate and a second transparent electrode layer, and a light control layer including a liquid crystal composition and formed between the first transparent electrode layer and the second transparent electrode layer. The first electrode sheet, the second electrode sheet, and the light control layer form a driver section in which the first electrode sheet, the second electrode sheet, and the light control layer are overlaid, a first non-driver section in which the first electrode sheet is exposed from the light control layer and the second electrode sheet, and a second non-driver section in which the second electrode sheet is exposed from the light control layer and the first electrode sheet, the first transparent electrode layer includes a first terminal in the first non-driver section such that the first terminal is electrically connected to a first driver portion of the first transparent electrode layer in the driver section, the second transparent electrode layer includes a second terminal in the second non-driver section such that the second terminal is electrically connected to a second driver portion of the second transparent electrode layer positioned in the driver section, and the first non-driver section and the second non-driver section have an insulating sealing section covering an end face of the light control layer such that an end face of the first transparent electrode layer is covered with the insulating sealing section at a position inside an end face of the first transparent substrate in the first non-driver section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a cross-sectional view of the light control sheet taken along a line V-V in

FIG. 1;

DETAILED DESCRIPTION OF THE EMBODIMENTS

Figure 1:
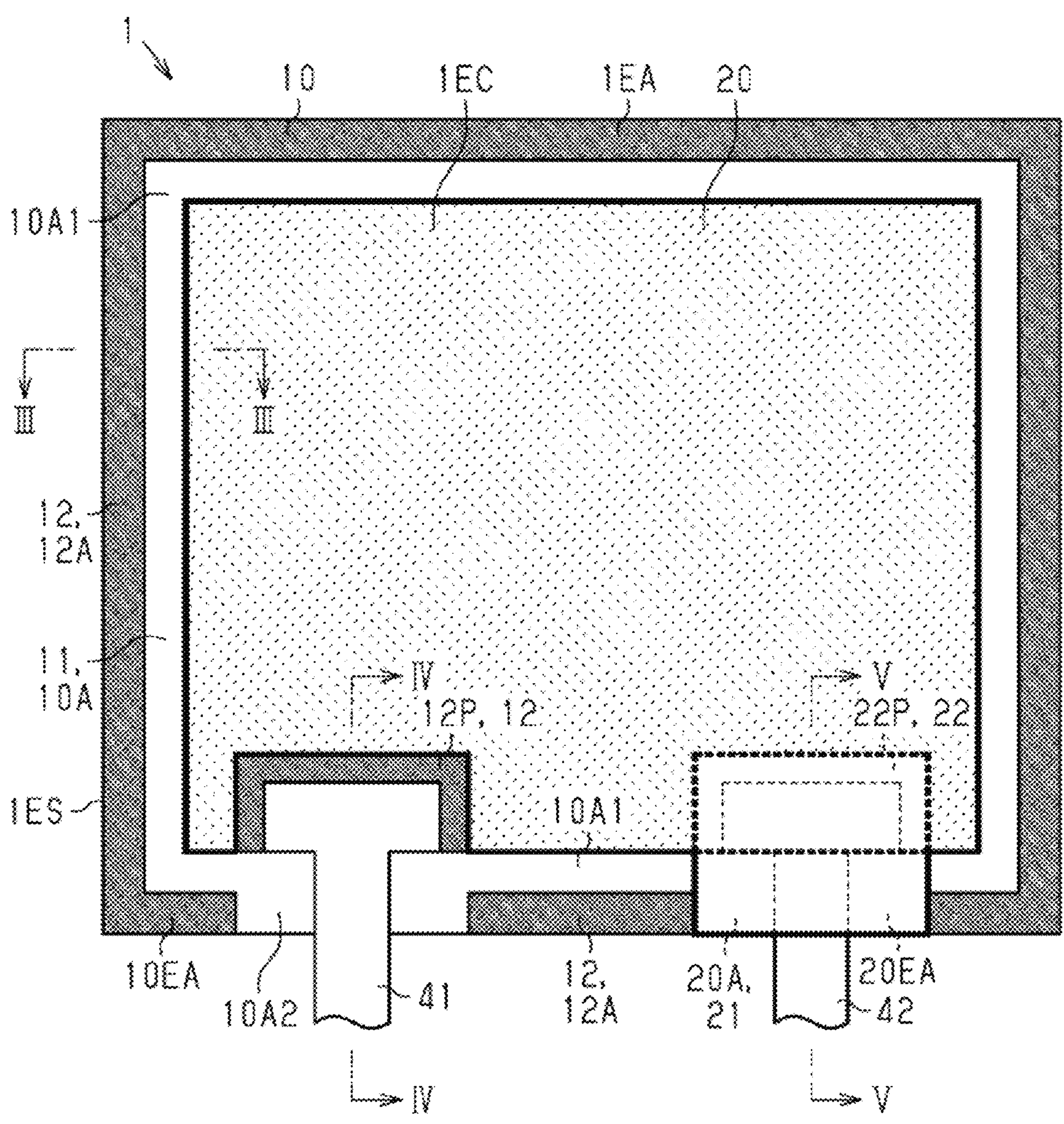
FIG. 1 is a plan view of a light control sheet.

Embodiments will now be described with reference to the accompanying drawings, wherein like reference numerals designate corresponding or identical elements throughout the various drawings.

Planar Structure of Light Control Sheet

A light control sheet according to an embodiment of the present invention are described below with reference to FIGS. 1 to 15. As illustrated in FIG. 1, a light control sheet 1 includes a first electrode sheet 10 and a second electrode sheet 20 each having light transmissivity. The first electrode sheet 10 is positioned in the background of the diagram with respect to the second electrode sheet 20. The second electrode sheet 20 is positioned in the foreground of the diagram with respect to the first electrode sheet 10. The first electrode sheet 10 is illustrated by a thin line and the second electrode sheet 20 is illustrated by a thick line in each of FIGS. 1 and 2 for the sake of convenience of the description of the relative positions of the first electrode sheet 10 and the second electrode sheet 20. In addition, FIGS. 1 and 2 each omit sealing sections 50 to 52 illustrated in FIGS. 3 to 5 and other diagrams for the sake of convenience of description.

The light control sheet 1 includes a driver section 1EC and a non-driver section 1EA in plan view from a viewpoint facing the light control sheet 1. The position of the driver section 1EC is shown light-dotted in each of FIGS. 1 and 2.

The driver section 1EC includes the first electrode sheet 10, the second electrode sheet 20, and a light control layer 30 (see FIG. 3) that is positioned between the first electrode sheet 10 and the second electrode sheet 20. The driver section 1EC is a portion at which the first electrode sheet 10, the second electrode sheet 20, and the light control layer 30 are overlaid. In other words, the portion at which the first electrode sheet 10, the second electrode sheet 20, and the light control layer 30 are overlaid forms the driver section 1EC. In the driver section 1EC, the application of a voltage between the first electrode sheet 10 and the second electrode sheet 20 changes the light transmittance of the light control layer 30.

The non-driver section 1EA includes the first electrode sheet 10 or the second electrode sheet 20. The non-driver section 1EA does not include the light control layer 30. The non-driver section 1EA is positioned around the driver section 1EC. In the light control sheet 1, a voltage necessary to drive the driver section 1EC is applied through the non-driver section 1EA. In the light control sheet 1, the sealing sections 50 to 52 necessary to protect the light control layer 30 are provided to the non-driver section 1EA.

The non-driver section 1EA includes a first non-driver section 10EA. The first non-driver section 10EA includes the first electrode sheet 10. The first non-driver section 10EA faces the foreground of the diagram in FIG. 1. In the first non-driver section 10EA, the first electrode sheet 10 is exposed from the second electrode sheet 20 and the light control layer 30. In other words, the portion of the first electrode sheet 10 that is exposed from the second electrode sheet 20 and the light control layer 30 forms the first non-driver section 10EA.

The non-driver section 1EA includes a second non-driver section 20EA. The second non-driver section 20EA includes the second electrode sheet 20. The second non-driver section 20EA faces the background of the diagram in FIG. 1. In the second non-driver section 20EA, the second electrode sheet 20 is exposed from the first electrode sheet 10 and the light control layer 30. In other words, the portion of the second electrode sheet 20 that is exposed from the first electrode sheet 10 and the light control layer 30 forms the second non-driver section 20EA.

An outer peripheral end face 1ES of the light control sheet 1 includes the first non-driver section 10EA or the second non-driver section 20EA. The first non-driver section 10EA is positioned on substantially the whole of the outer peripheral section of the light control sheet 1 except for the second non-driver section 20EA in plan view. The driver section 1EC is framed by the first non-driver section 10EA and the second non-driver section 20EA in plan view.

The first electrode sheet 10 includes a first transparent substrate 11 having insulating properties and a first transparent electrode layer 12 having electrical conductivity. The first transparent substrate 11 is positioned in the background of the diagram with respect to the first transparent electrode layer 12 in FIG. 1. The first transparent electrode layer 12 is positioned in the foreground of the diagram with respect to the first transparent substrate 11 in FIG. 1. The portion of the first transparent electrode layer 12 positioned in the first non-driver section 10EA is shown heavy-dotted in FIG. 1.

The first transparent electrode layer 12 positioned in the first non-driver section 10EA includes a first terminal 12P. The first terminal 12P is adjacent to the driver section 1EC. The first terminal 12P is electrically connected to the first transparent electrode layer 12 positioned in the driver section 1EC. When described in detail, the first terminal 12P is electrically connected to the first driver portion of the first transparent electrode layer 12 positioned in the driver section 1EC. The first terminal 12P is positioned inside the outer peripheral end face 1ES of the light control sheet 1. A first external wiring line 41 is connected to the first terminal 12P. The first external wiring line 41 applies a voltage to the first transparent electrode layer 12 positioned in the driver section 1EC through the first terminal 12P.

The first transparent electrode layer 12 positioned in the first non-driver section 10EA includes a non-conductive section 12A. The non-conductive section 12A is not electrically connected to the first terminal 12P and the first transparent electrode layer 12 positioned in the driver section 1EC. When described in detail, the non-conductive section 12A is not electrically connected to the first driver portion of the first transparent electrode layer 12.

The first non-driver section 10EA includes a first non-electrode section 10A. The first non-electrode section 10A includes the first transparent substrate 11 and does not include the first transparent electrode layer 12. The first non-electrode section 10A includes a first portion 10A1 and a second portion 10A2. The first portion 10A1 is positioned at the portion of the boundary between the first non-driver section 10EA and the driver section 1EC except for the first terminal 12P. The second portion 10A2 extends outward from the first terminal 12P. The second portion 10A2 is included in the outer peripheral end face 1ES of the light control sheet 1.

The first non-electrode section 10A is continuously provided to surround the driver section 1EC and the first terminal 12P with the first portion 10A1 and the second portion 10A2. The first non-electrode section 10A is an example of a disconnection section that defines the non-conductive section 12A in the first transparent electrode layer 12 positioned in the first non-driver section 10EA. That is, the first non-driver section 10EA includes a disconnection section that separates the non-conductive section 12A from the first driver portion and the first terminal 12P.

Figure 2:
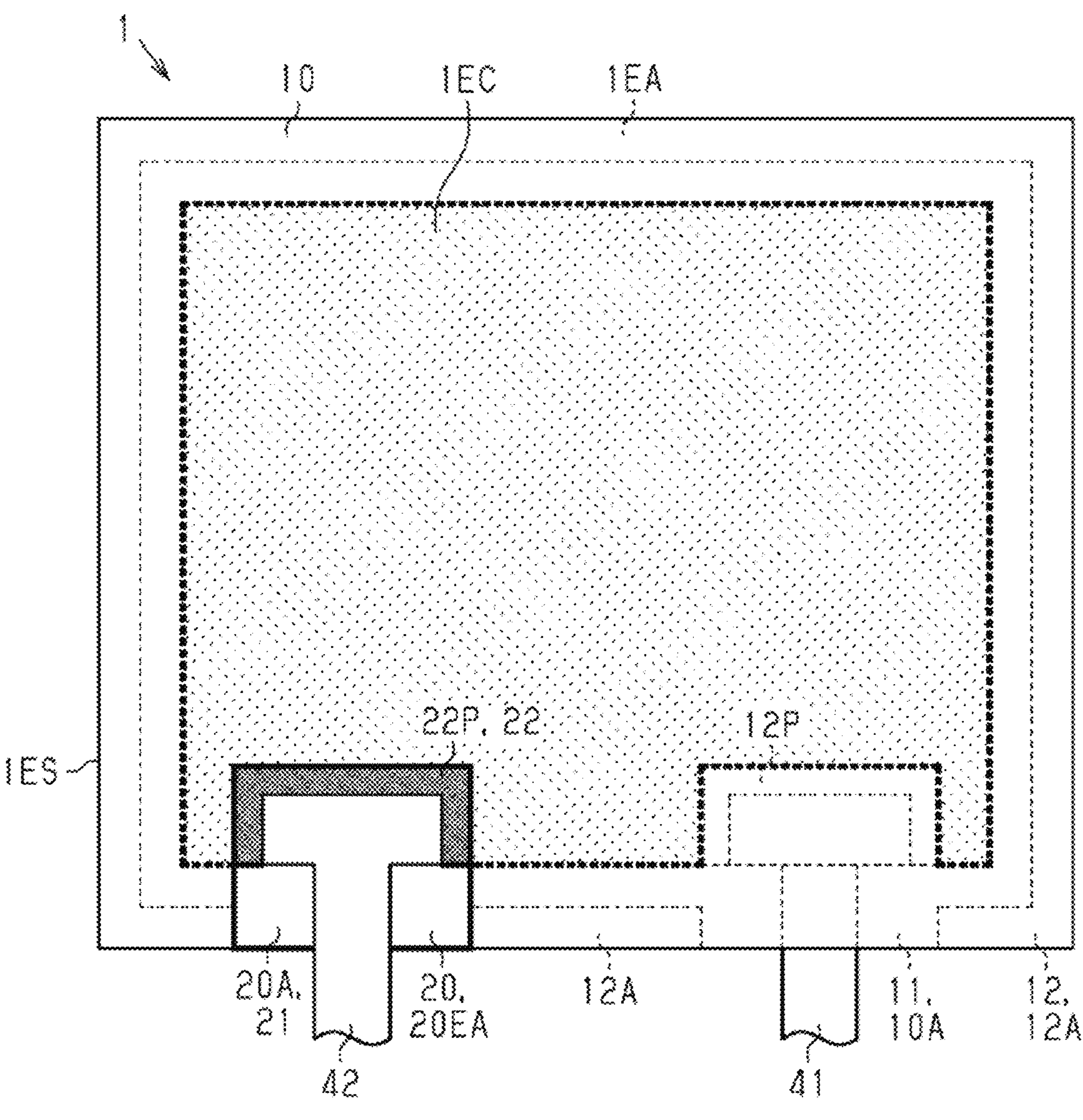
FIG. 2 is a plan view of the light control sheet from the opposite side to FIG. 1.

As illustrated in FIG. 2, the second electrode sheet 20 includes a second transparent substrate 21 having insulating properties and a second transparent electrode layer 22 having electrical conductivity. The second transparent substrate 21 is positioned on the opposite side to the first electrode sheet 10 with respect to the second transparent electrode layer 22. That is, the second transparent substrate 21 is positioned in the background of the diagram in FIG. 2. The second transparent electrode layer 22 is positioned on the same side as that of the first electrode sheet 10 with respect to the second transparent substrate 21. That is, the second transparent electrode layer 22 is positioned in the foreground of the diagram in FIG. 2. The portion of the second transparent electrode layer 22 positioned in the second non-driver section 20EA is thick-dotted in FIG. 2.

The second transparent electrode layer 22 positioned in the second non-driver section 20EA includes a second terminal 22P. The second terminal 22P is adjacent to the driver section 1EC. The second terminal 22P is electrically connected to the second transparent electrode layer 22 positioned in the driver section 1EC. When described in detail, the second terminal 22P is electrically connected to the second driver portion of the second transparent electrode layer 22 positioned in the driver section 1EC. The second terminal 22P is positioned inside the outer peripheral end face 1ES of the light control sheet 1. A second external wiring line 42 is connected to the second terminal 22P. The second external wiring line 42 applies a voltage to the second transparent electrode layer 22 positioned in the driver section 1EC through the second terminal 22P. In one example, the first terminal 12P and the second terminal 22P are provided side by side at an end of the driver section 1EC.

The second non-driver section 20EA includes a second non-electrode section 20A. The second non-electrode section 20A includes the second transparent substrate 21 and does not include the second transparent electrode layer 22 in the second electrode sheet 20. The second non-electrode section 20A extends outward from the second terminal 22P. The second non-electrode section 20A is included in the outer peripheral end face 1ES of the light control sheet 1.

Cross-Sectional Structure of Light Control Sheet

Figure 3:
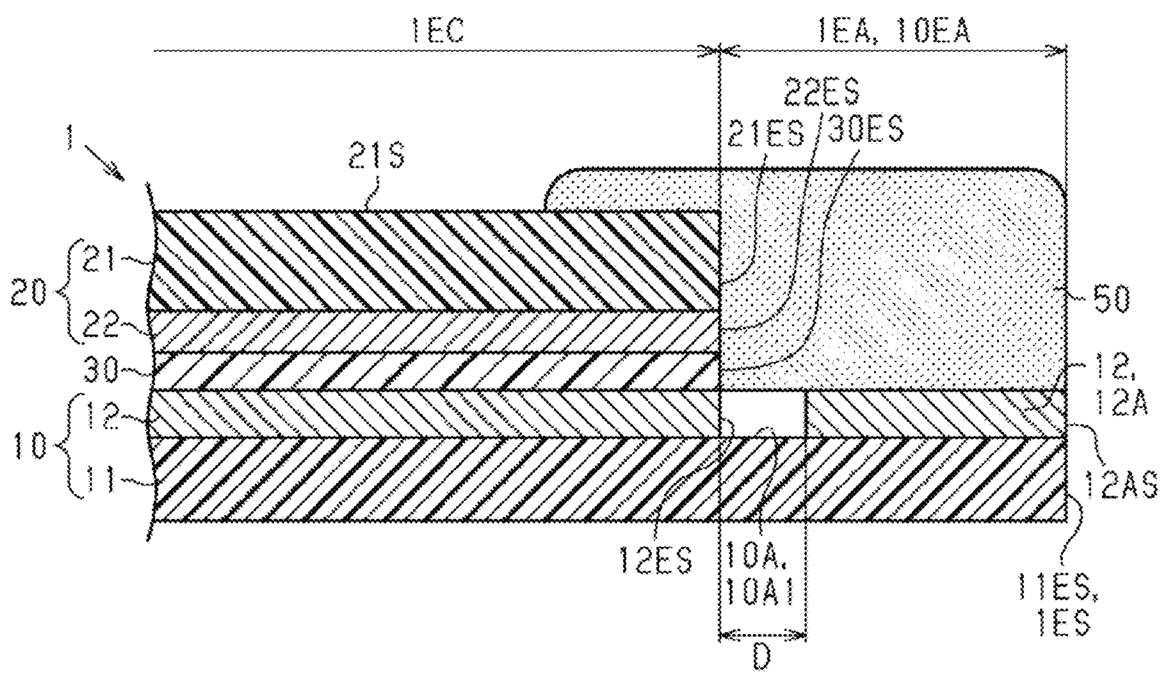
FIG. 3 is a cross-sectional view of the light control sheet taken along a line III-III in FIG. 1.

As illustrated in FIG. 3, the light control sheet 1 is a laminated body obtained by laminated the first electrode sheet 10, the second electrode sheet 20, and the light control layer 30 in the thickness direction of each sheet. The light control layer 30 is positioned between the first transparent electrode layer 12 included in the first electrode sheet 10 and the second transparent electrode layer 22 included in the second electrode sheet 20. In the light control sheet 1, the first transparent substrate 11, the first transparent electrode layer 12, the light control layer 30, the second transparent electrode layer 22, and the second transparent substrate 21 are laminated in this order.

The first transparent substrate 11 and the second transparent substrate 21 each have light transmissivity to visible light and each have electrically insulating properties. Materials included in the first transparent substrate 11 and the second transparent substrate 21 are organic polymer compounds or inorganic polymer compounds. Each of the organic polymer compounds is, for example, at least one selected from the group of polyesters, polyacrylates, polycarbonates, and polyolefins. Each of the inorganic polymer compounds is, for example, at least one selected from the group of silicon dioxide, silicon oxynitride, and silicon nitride.

The first transparent electrode layer 12 and the second transparent electrode layer 22 each have light transmissivity to transmit visible light and each have electrical conductivity. Each of materials included in the first transparent electrode layer 12 and the second transparent electrode layer 22 is, for example, at least one selected from the group of indium tin oxide, fluorine-doped tin oxide, tin oxide, zinc oxide, carbon nanotubes, and poly 3,4-ethylenedioxythiophene.

The light control layer 30 has light transmittance that differs before and after the application of a voltage. An example of the light control layer 30 includes a transparent organic polymer layer and a liquid crystal composition. The transparent organic polymer layer defines a void between the first transparent electrode layer 12 and the second transparent electrode layer 22. The void of the transparent organic polymer layer is filled with the liquid crystal composition. The liquid crystal composition includes a liquid crystal compound. The liquid crystal compound is, for example, at least one selected from a Schiff base compound, an azo-based compound, an azoxy-based compound, a biphenyl-based compound, a terphenyl-based compound, a benzoic-acid-ester-based compound, a tolan-based compound, a pyrimidine-based compound, a cyclohexanecarboxylic-acid-ester-based compound, a phenylcyclohexane-based compound, and a dioxane-based compound.

The type in which the transparent organic polymer layer holds a liquid crystal composition is, for example, at least one selected from the group consisting of a polymer network type, a polymer dispersion type, and a capsule type. In the polymer network type, the transparent organic polymer layer includes a transparent polymer network having a three-dimensional mesh shape and holds a liquid crystal composition in mesh-shaped voids that communicate with each other. In the polymer dispersion type, the transparent organic polymer layer has a large number of isolated voids therein. Liquid crystal compositions are held in the voids dispersed in the transparent organic polymer layer. In the capsule type, an encapsulated liquid crystal composition is held in the transparent organic polymer layer. The liquid crystal composition may contain a monomer and a dichroic dye for forming the transparent organic polymer layer in addition to the liquid crystal compounds described above.

The first portion 10A1 is positioned between the first transparent electrode layer 12 positioned in the driver section 1EC and the non-conductive section 12A in the first non-driver section 10EA. The first portion 10A1 is a recessed groove having a void that extends through the first transparent electrode layer 12 in the thickness direction. The non-conductive section 12A is positioned closer to the outer periphery than the first portion 10A1 is. An end face 12AS of the non-conductive section 12A is included in the outer peripheral end face 1ES of the light control sheet 1 along with an end face 11ES of the first transparent substrate 11.

The non-conductive section 12A is separated from the first transparent electrode layer 12 positioned in the driver section 1EC by the first non-electrode section 10A. Therefore, an electric current flowing through the driver section 1EC is blocked by the first non-electrode section 10A even with a voltage applied to the driver section 1EC through the first terminal 12P and the second terminal 22P, and the non-conductive section 12A is not thus energized.

It is preferable that an end face 12ES of the portion of the first transparent electrode layer 12 energized when a voltage is applied to the driver section 1EC and the non-conductive section 12A have a distance D therebetween of 27 μm or more. If the distance D is greater than or equal to 27 μm, it is possible to more reliably insulate the driver section 1EC and the non-conductive section 12A. The distance D corresponds to the width of the first portion 10A1 illustrated in FIG. 3.

On the boundary between the driver section 1EC and the first non-driver section 10EA, the portion of the first non-driver section 10EA except for the first terminal 12P is provided with the outer peripheral sealing section 50. The outer peripheral sealing section 50 is a resin having insulating properties. In one example, the outer peripheral sealing section 50 is formed by using an epoxy resin, an acryl-based resin, or the like.

The outer peripheral sealing section 50 is in close contact with the non-conductive section 12A and is in close contact with an end face 21ES of the second transparent substrate 21, an end face 22ES of the second transparent electrode layer 22, and an end face 30ES of the light control layer 30 in the driver section 1EC. Further, the outer peripheral sealing section 50 is also in close contact with an outer surface 21S of the second transparent substrate 21 of the second electrode sheet 20. That is, the outer peripheral sealing section 50 is in contact with the non-conductive section 12A and the outer surface 21S of the second transparent substrate 21, and the end face 21ES of the second transparent substrate 21, the end face 22ES of the second transparent electrode layer 22, and the end face 30ES of the light control layer 30 in the driver section 1EC. The outer surface 21S is the opposite surface of the second electrode sheet 20 to the surface in contact with the light control layer 30.

In a case where the distance D corresponding to the width of the first portion 10A1 is short, the first portion 10A1 is not filled with the outer peripheral sealing section 50 in some cases depending on the viscosity of a material included in the outer peripheral sealing section 50 or the wettability of the outer peripheral sealing section 50 and the first transparent electrode layer 12. In this case, the first portion 10A1 is left behind as a void. Even in this case, the outer peripheral sealing section 50 maintains the distance D between the end face 12ES and the non-conductive section 12A to prevent the end face 12ES of the first transparent electrode layer 12 and the non-conductive section 12A from being electrically connected if the light control sheet 1 is bent.

The outer peripheral sealing section 50 comes into close contact with the outer surface 21S to increase the contact area between the outer peripheral sealing section 50 and the light control sheet 1. This makes it possible to increase the peel strength of the outer peripheral sealing section 50. Additionally, in a case where it is necessary to decrease the thickness of the light control sheet 1 including the outer peripheral sealing section 50 or make the thickness uniform, the outer peripheral sealing section 50 does not have to be positioned on the outer surface 21S as long as at least the end face 30ES of the light control layer 30 is configured to be covered.

The outer peripheral sealing section 50 covers the end face 30ES of the light control layer 30 to prevent the liquid crystal composition included in the light control layer 30 from leaking externally from the end face 30ES and suppress deterioration of the liquid crystal composition by acid, moisture, ultraviolet rays, or the like.

The outer peripheral end of the outer peripheral sealing section 50 has the same position as the position of the outer peripheral end face 1ES of the light control sheet 1 or is positioned inside the outer peripheral end face 1ES. If the outer peripheral sealing section 50 is provided outside the outer peripheral end face 1ES of the light control sheet 1, the outer peripheral sealing section 50 positioned outside the outer peripheral end face 1ES is likely to get caught during attachment of the light control sheet 1 or the like and thus easily causes peeling. In this regard, the first non-driver section 10EA provided around the driver section 1EC is provided with the outer peripheral sealing section 50, making it possible to the secure contact area necessary to bring the outer peripheral sealing section 50 and the light control sheet 1 into close contact even without providing the outer peripheral sealing section 50 outside the outer peripheral end face 1ES of the light control sheet 1.

Figure 4:
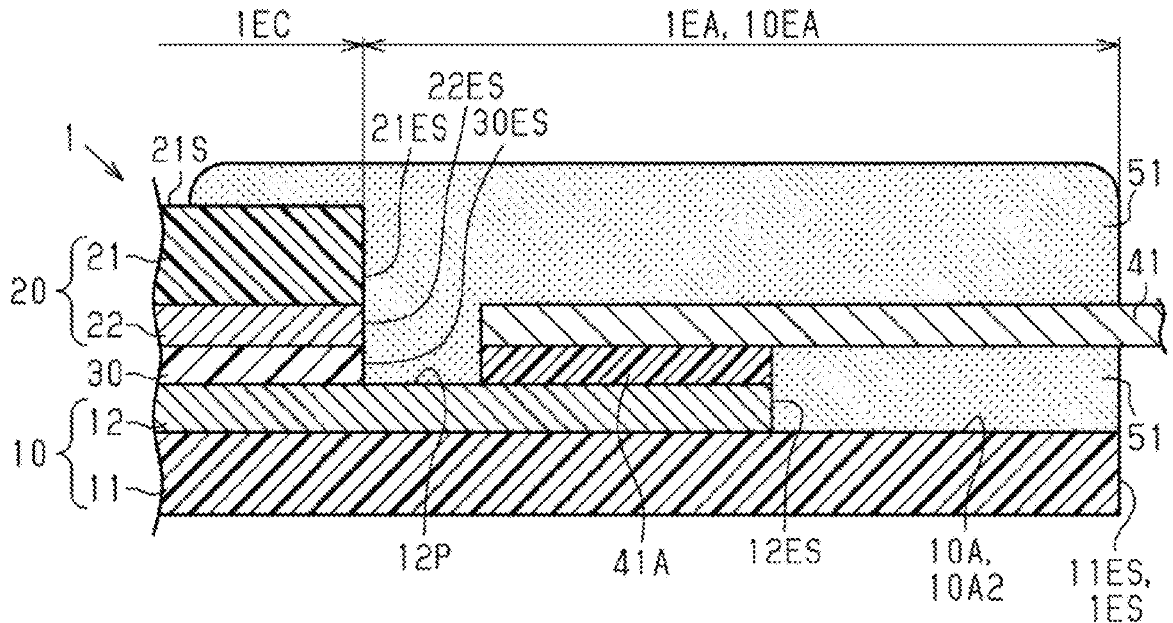
FIG. 4 is a cross-sectional view of the light control sheet taken along a line IV-IV in FIG. 1.

As illustrated in FIG. 4, in the portion of the first non-driver section 10EA including the second portion 10A2, the outer peripheral end face 1ES of the light control sheet 1 includes the end face 11ES of the first transparent substrate 11. The first transparent electrode layer 12 extends closer to the outer peripheral end face 1ES of the light control sheet 1 than the driver section 1EC does. The first transparent electrode layer 12 extending from the driver section 1EC is included in the first terminal 12P. In addition, the end face 12ES of the first transparent electrode layer 12 is positioned inside the end face 11ES of the first transparent substrate 11. The end face 12ES of the first transparent electrode layer 12 defines the second portion 10A2.

The first external wiring line 41 is bonded to the first terminal 12P with a first electrically conductive adhesive 41A in between. In one example, the first external wiring line 41 is a flexible printed board (flexible printed circuits (FPCs)). The first electrically conductive adhesive 41A is, for example, at least one selected from the group of an anisotropic electrically conductive film (anisotropic conductive film (ACF)), an anisotropic electrically conductive paste (anisotropic conductive paste (ACP)), an isotropic electrically conductive film (isotropic conductive film (ICF)), and an isotropic electrically conductive paste (isotropic conductive paste (ICP)).

The boundary between the driver section 1EC and the first terminal 12P is provided with the first terminal sealing section 51. The first terminal sealing section 51 is a resin having insulating properties. In one example, the first terminal sealing section 51 is formed by using an epoxy resin, an acryl-based resin, or the like. The first terminal sealing section 51 may be the same type of material as that of the outer peripheral sealing section 50 or may be a different material.

The first terminal sealing section 51 is in close contact with the first terminal 12P and is in close contact with the end face 21ES of the second transparent substrate 21, the outer surface 21S of the second transparent substrate 21, the end face 22ES of the second transparent electrode layer 22, and the end face 30ES of the light control layer 30 in the driver section 1EC. In other words, the first terminal sealing section 51 is in contact with the first terminal 12P and the outer surface 21S of the second transparent substrate 21, and the end face 21ES of the second transparent substrate 21, the end face 22ES of the second transparent electrode layer 22, and the end face 30ES of the light control layer 30 in the driver section 1EC. The outer peripheral sealing section 50 and the first terminal sealing section 51 are continuously provided on the boundary between the driver section 1EC and the first non-driver section 10EA. The first terminal sealing section 51 covers the end face 30ES of the light control layer 30 to prevent the liquid crystal composition included in the light control layer 30 from leaking externally from the end face 30ES and suppress the deterioration of the liquid crystal composition by acid, moisture, ultraviolet rays, or the like.

The first terminal sealing section 51 is also provided around the first external wiring line 41 and the first electrically conductive adhesive 41A. The first terminal sealing section 51 is in close contact with the connection portion between the first terminal 12P and the first external wiring line 41 with the first electrically conductive adhesive 41A therebetween and is in close contact with the end face 12ES of the first transparent electrode layer 12 that is part of the first terminal 12P and the second portion 10A2. In other words, the first terminal sealing section 51 is in contact with the connection portion between the first terminal 12P and the first external wiring line 41 and is in contact with the end face 12ES of the first transparent electrode layer 12 that is part of the first terminal 12P and the second portion 10A2. The outer peripheral end of the first terminal sealing section 51 has the same position as the position of the outer peripheral end face 1ES of the light control sheet 1 or is positioned inside the outer peripheral end face 1ES.

The end face 12ES that is part of the first terminal 12P is a portion energized when a voltage is applied to the driver section 1EC. It is thus possible to prevent the energized first transparent electrode layer 12 from being exposed externally, by disposing the end face 12ES inside the end face 11ES of the first transparent substrate 11 and covering the end face 12ES with the first terminal sealing section 51.

Figure 5:
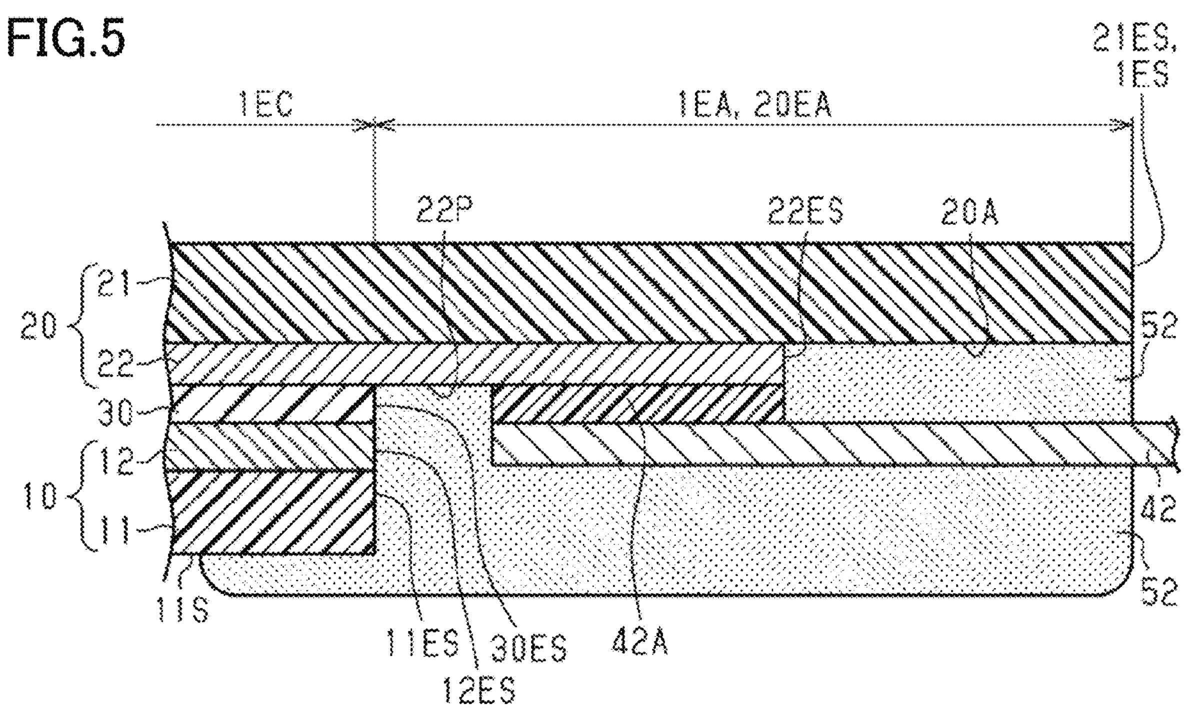

As illustrated in FIG. 5, in the second non-driver section 20EA, the outer peripheral end face 1ES of the light control sheet 1 includes the end face 21ES of the second transparent substrate 21. The second transparent electrode layer 22 extends closer to the outer peripheral end face 1ES of the light control sheet 1 than the driver section 1EC does. The second transparent electrode layer 22 extending from the driver section 1EC is included in the second terminal 22P. In addition, the end face 22ES of the second transparent electrode layer 22 is positioned inside the end face 21ES of the second transparent substrate 21. The end face 22ES of the second transparent electrode layer 22 thereby defines the second non-electrode section 20A.

The second external wiring line 42 is bonded to the second terminal 22P with a second electrically conductive adhesive 42A in between. In one example, the second external wiring line 42 is a flexible printed board. It is possible to use, for example, the same type of material for the second electrically conductive adhesive 42A as that of the first electrically conductive adhesive 41A.

The boundary between the driver section 1EC and the second terminal 22P is provided with the second terminal sealing section 52. The second terminal sealing section 52 is a resin having insulating properties. In one example, the second terminal sealing section 52 is formed by using an epoxy resin, an acryl-based resin, or the like. The second terminal sealing section 52 may be the same type of material as that of the outer peripheral sealing section 50 or the first terminal sealing section 51 or may be a different material.

The second terminal sealing section 52 is in close contact with the second terminal 22P and is in close contact with the end face 11ES of the first transparent substrate 11, the end face 12ES of the first transparent electrode layer 12, and the end face 30ES of the light control layer 30 in the driver section 1EC. Further, the second terminal sealing section 52 may also be in close contact with an outer surface 11S of the first transparent substrate 11 in the first electrode sheet 10. In other words, the second terminal sealing section 52 is in contact with the second terminal 22P and the outer surface 11S of the first transparent substrate 11, and the end face 11ES of the first transparent substrate 11, the end face 12ES of the first transparent electrode layer 12, and the end face 30ES of the light control layer 30 in the driver section 1EC. The outer surface 11S is the opposite surface of the first electrode sheet 10 to the surface in contact with the light control layer 30.

The second terminal sealing section 52 is also provided around the second external wiring line 42 and the second electrically conductive adhesive 42A. The second terminal sealing section 52 is in close contact with the connection portion between the second terminal 22P and the second external wiring line 42 with the second electrically conductive adhesive 42A in between and is in close contact with the end face 22ES of the second transparent electrode layer 22 that is part of the second terminal 22P and the second portion 10A2. In other words, the second terminal sealing section 52 is in contact with the connection portion between the second terminal 22P and the second external wiring line 42 and is in contact with the end face 22ES of the second transparent electrode layer 22 that is part of the second terminal 22P and the second portion 10A2. The outer periphery end of the second terminal sealing section 52 has the same position as the position of the outer peripheral end face 1ES of the light control sheet 1 or is positioned inside the outer peripheral end face 1ES.

The end face 22ES that is part of the second terminal 22P is a portion energized when a voltage is applied to the driver section 1EC. It is thus possible to prevent the energized second transparent electrode layer 22 from being exposed externally by disposing the end face 22ES inside the end face 21ES of the second transparent substrate 21 and covering the end face 22ES with the second terminal sealing section 52.

Method for Manufacturing Light Control Sheet

In a method for manufacturing the light control sheet 1, the light control sheet 1 is first prepared that includes the first electrode sheet 10, the second electrode sheet 20, and the light control layer 30 which is positioned between the first electrode sheet 10 and the second electrode sheet 20. For example, the first electrode sheet 10 is drawn from a roll body and the second electrode sheet 20 is drawn from another roll body. A liquid crystal composition including an ultraviolet-curing resin is then applied to the first electrode sheet 10. After that, the second electrode sheet 20 is bonded to the first electrode sheet 10. Subsequently, the liquid crystal composition is irradiated with ultraviolet rays. This forms the light control layer 30 between the first electrode sheet 10 and the second electrode sheet 20. Next, the outer shape of the laminated body is cut such that the outer shape of the first electrode sheet 10 and the outer shape of the second electrode sheet 20 match each other. The light control sheet 1 is thus prepared.

Part of the first electrode sheet 10 is then removed by using a cutter along with the light control layer 30 overlapping with the part of the first electrode sheet 10. For example, the first electrode sheet 10 is cut in half by a cutter along the boundary between the first non-driver section 10EA and the driver section 1EC and the boundary between the first non-driver section 10EA and the second non-driver section 20EA. This defines the first non-driver section 10EA in the light control sheet 1. Further, part of the first transparent electrode layer 12 is removed to define the first terminal 12P and the non-conductive section 12A in the first non-driver section 10EA. The first non-electrode section 10A is thus formed.

The first non-electrode section 10A may be formed by making a slit in the part of the first transparent electrode layer 12 with a cutting tool such as a cutter. The first non-electrode section 10A may be formed by removing the part of the first transparent electrode layer 12 with a laser. The first non-electrode section 10A may be formed by peeling off the first transparent electrode layer 12 at a predetermined width. The first non-electrode section 10A may be formed by removing part of the first transparent electrode layer 12 with chemical process such as etching. The first non-electrode section 10A may be formed by combining the processing methods described above.

Furthermore, a portion of the second electrode sheet 20 is removed using a cutter, together with the light control layer 30 overlapping that portion.

For example, the second electrode sheet 20 is half-cut using a cutter along the boundary between the second non-driver section 20EA and the driver section 1EC. This defines the second non-driver section 20EA in the light control sheet 1. Further, part of the second transparent electrode layer 22 is removed to define the second terminal 22P in the second non-driver section 20EA. The second non-electrode section 20A is thus formed. Additionally, it is possible to form the second non-electrode section 20A by using a method similar to that of the first non-electrode section 10A.

The first external wiring line 41 and the second external wiring line 42 are attached to the light control sheet 1 in which the first non-driver section 10EA and the second non-driver section 20EA are formed in the procedure described above. After that, the outer peripheral sealing section 50, the first terminal sealing section 51, and the second terminal sealing section 52 cover the whole of the end face 30ES of the light control layer 30.

According to the embodiment described above, it is possible to obtain advantages listed below.

1. The first portion 10A1 electrically insulates the non-conductive section 12A positioned in the outer peripheral end face 1ES of the light control sheet 1 and the driver section 1EC by the first portion 10A1. This makes it possible to prevent the energized first transparent electrode layer 12 from being exposed on the outer peripheral end face 1ES of the light control sheet 1.
2. It is possible to define the non-conductive section 12A in a simple configuration of removing the first transparent electrode layer 12 positioned in the first non-driver section 10EA by including the first non-electrode section 10A in a disconnection section that defines the non-conductive section 12A.
3. It is possible to prevent the energized first transparent electrode layer 12 from being exposed to the outside by disposing the end face 12ES of the first transparent electrode layer 12 inside the end face 11ES of the first transparent substrate 11 and covering the end face 12ES with the first terminal sealing section 51. Similarly, it is possible to prevent the energized second transparent electrode layer 22 from being exposed to the outside by disposing the end face 22ES of the second transparent electrode layer 22 inside the end face 21ES of the second transparent substrate 21 and covering the end face 22ES with the second terminal sealing section 52.

MODIFICATION EXAMPLES

Additionally, it is possible to modify and carry out the embodiment described above as below. In addition, it is possible to combine the following modification examples within the scope within which technical inconsistency is avoided.

Figure 6:
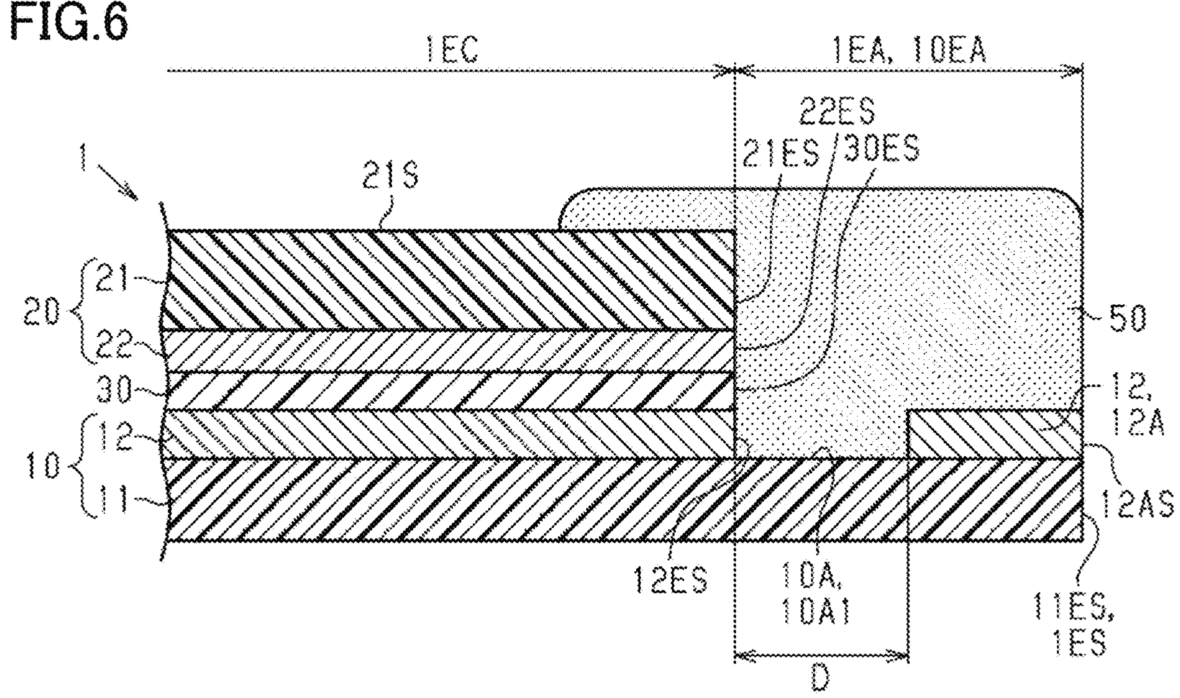
FIG. 6 is a cross-sectional view of a modification example of a cross-sectional shape illustrated in FIG. 3.

As illustrated in FIG. 6, the first portion 10A1 may be filled with the outer peripheral sealing section 50. In this case, the outer peripheral sealing section 50 with which the first portion 10A1 is filled makes it possible to more reliably prevent the first transparent electrode layer 12 or the second transparent electrode layer 22 positioned in the driver section 1EC and the non-conductive section 12A from being electrically connected when the light control sheet 1 is bent. For example, the first portion 10A1 may be filled with the outer peripheral sealing section 50 by using a material having low viscosity as the outer peripheral sealing section 50 to facilitate the outer peripheral sealing section 50 entering the first portion 10A1. For example, the first portion 10A1 may be filled with the outer peripheral sealing section 50 by increasing the distance D corresponding to the width of the first portion 10A1.

Figure 7:
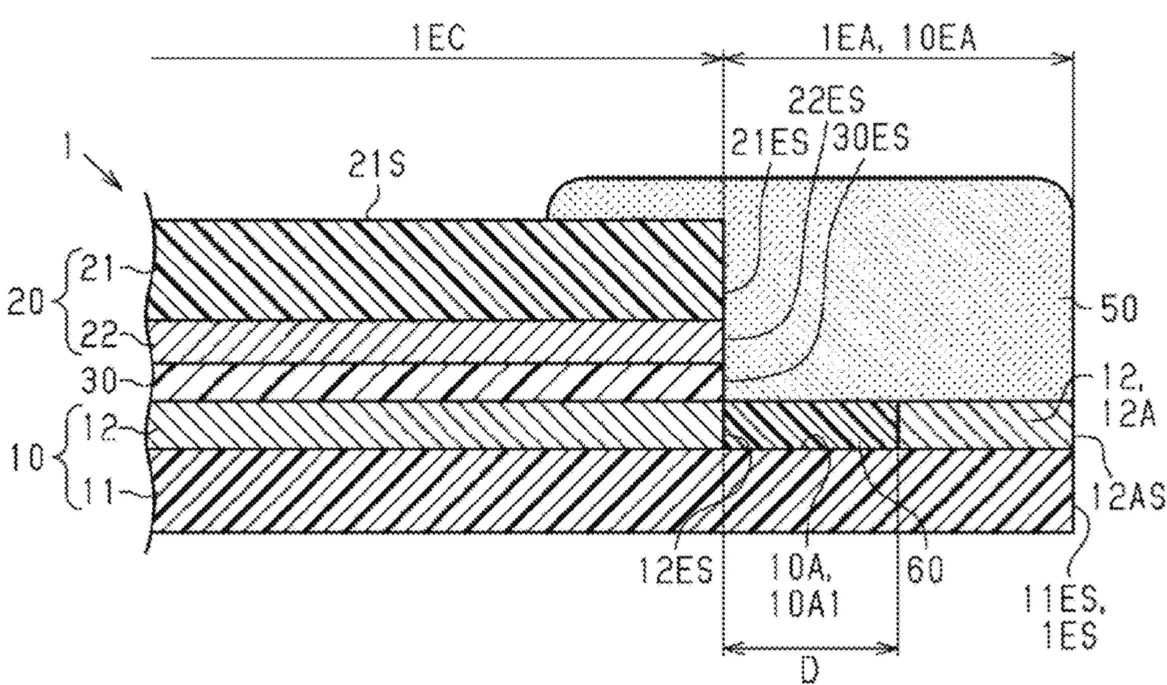
FIG. 7 is a cross-sectional view of a modification example of the cross-sectional shape illustrated in FIG. 3.

As illustrated in FIG. 7, the first portion 10A1 may be filled with an insulator 60 that is different in type from the outer peripheral sealing section 50. In this case, as in a case where the first portion 10A1 is filled with the outer peripheral sealing section 50, the insulator 60 with which the first portion 10A1 is filled makes it possible to more reliably prevent the driver section 1EC and the non-conductive section 12A from being electrically connected when the light control sheet 1 is bent. In addition, for example, the use of a material having greater electrical resistance as the insulator 60 than that of the outer peripheral sealing section 50 makes it possible to more reliably insulate the driver section 1EC and the non-conductive section 12A than in a case where the first portion 10A1 is filled with the outer peripheral sealing section 50. For example, the use of a material having lower viscosity as the insulator 60 than that of the outer peripheral sealing section 50 makes it possible to favorably fill the first portion 10A1 with the insulator 60 even in a case where it is difficult to fill the first portion 10A1 with the outer peripheral sealing section 50.

Figure 8:
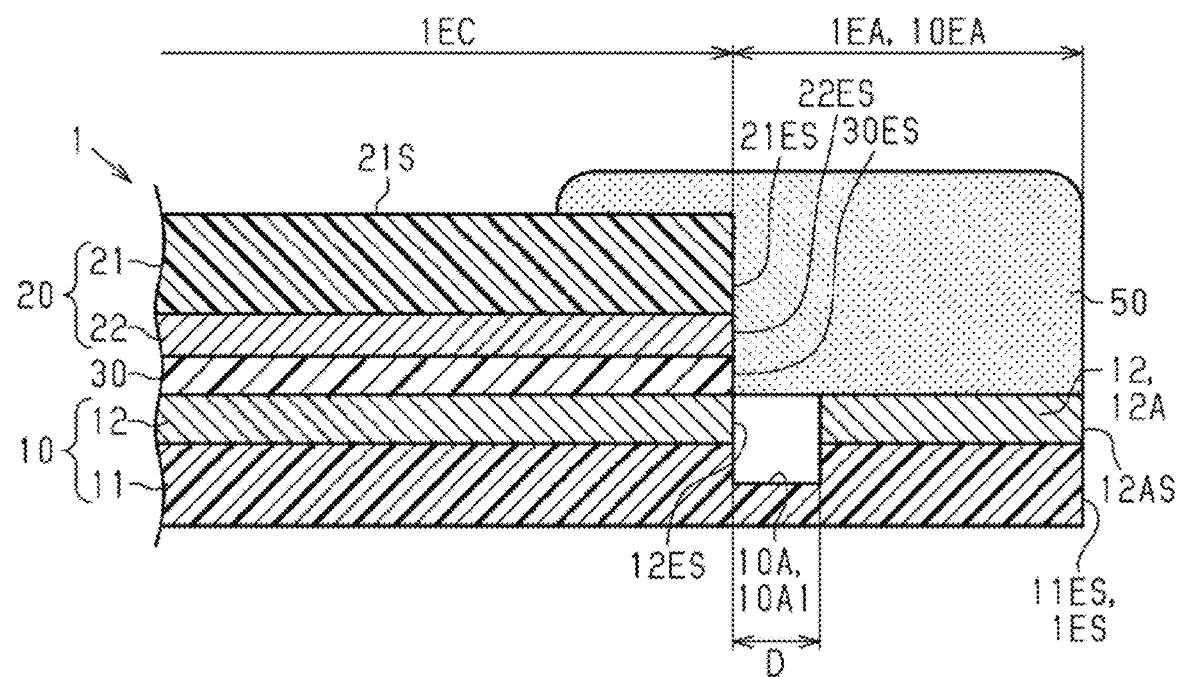
FIG. 8 is a cross-sectional view of a modification example of the cross-sectional shape illustrated in FIG. 3.

As illustrated in FIG. 8, the first portion 10A1 may be a recessed groove having a void that extends through the first transparent electrode layer 12 in the thickness direction and a recess of the first transparent substrate 11 that is recessed in the thickness direction. In this case, the distance along the surface between the driver section 1EC and the non-conductive section 12A with the first transparent substrate 11 in between is longer than in a case where the first portion 10A1 is flush with the surface of the first transparent substrate 11 in contact with the first transparent electrode layer 12. It is thus possible to more reliably prevent the driver section 1EC and the non-conductive section 12A from being electrically connected.

Figure 9:
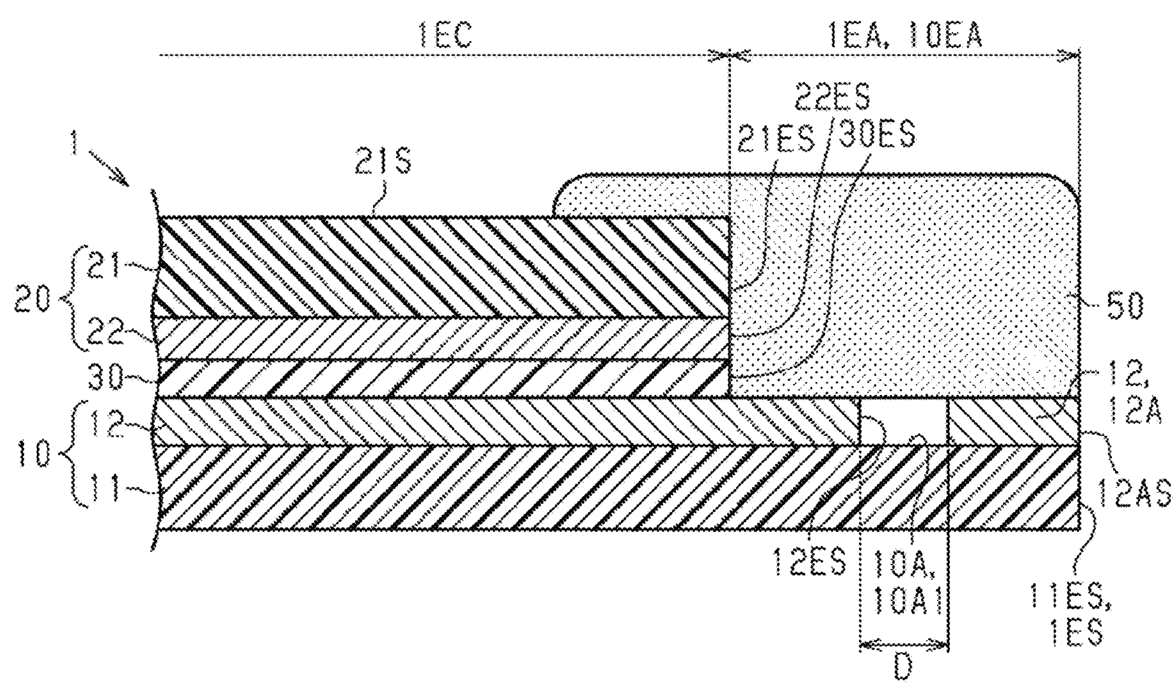
FIG. 9 is a cross-sectional view of a modification example of the cross-sectional shape illustrated in FIG. 3.

As illustrated in FIG. 9, the first portion 10A1 is not positioned on the boundary between the driver section 1EC and the first non-driver section 10EA, but may be positioned closer to the outer peripheral end face 1ES of the light control sheet 1 than the boundary between the driver section 1EC and the first non-driver section 10EA is. That is, the first portion 10A1 may be positioned between the boundary and the outer peripheral end face 1ES. Even in this case, it is possible to obtain the advantages equivalent to those of 1 and 2 above.

Figure 10:
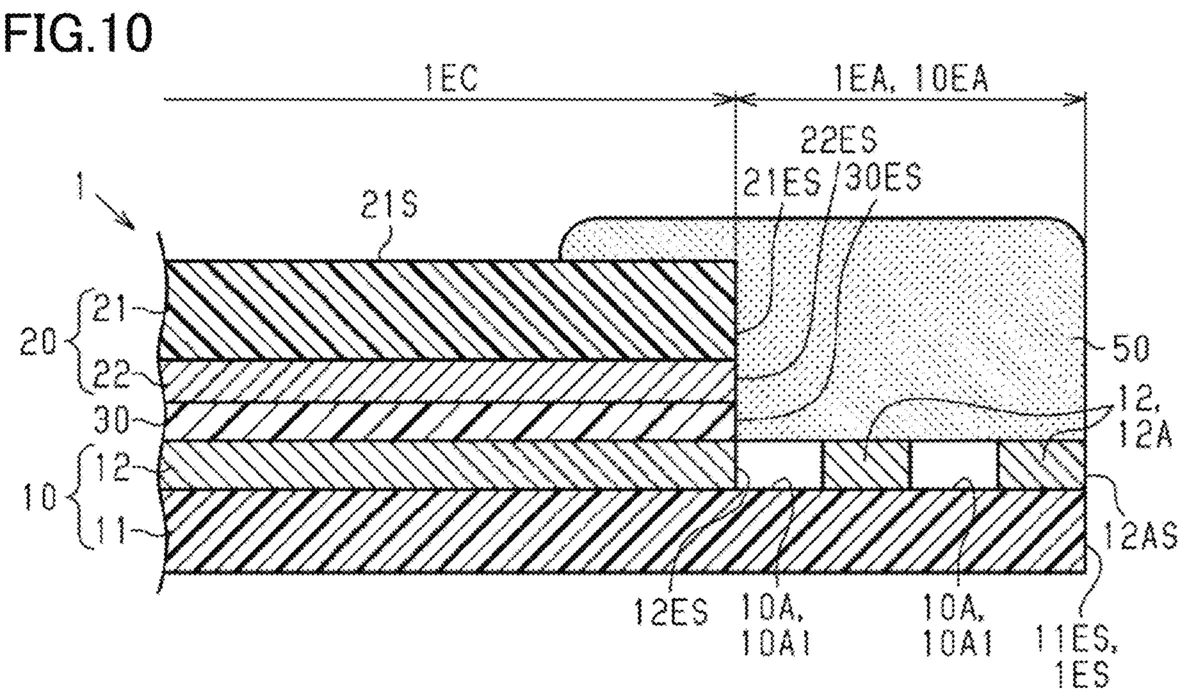
FIG. 10 is a cross-sectional view of a modification example of the cross-sectional shape illustrated in FIG. 3.

As illustrated in FIG. 10, the first non-driver section 10EA may include the plurality of first portions 10A1 between the driver section 1EC and the outer peripheral end face 1ES of the light control sheet 1. In this case, the non-conductive sections 12A are provided between the adjacent first portions 10A1 and between the first portion 10A1 and the outer peripheral end face 1ES of the light control sheet 1. The respective non-conductive sections 12A are not electrically connected to each other. According to such a configuration, even if the light control sheet 1 is bent to electrically connect the non-conductive section 12A that is the closest to the driver section 1EC to the driver section 1EC, the non-conductive section 12A included in the outer peripheral end face 1ES of the light control sheet 1 is not electrically connected. It is thus possible to more reliably prevent the driver section 1EC and the non-conductive section 12A from being electrically connected.

Figure 11:
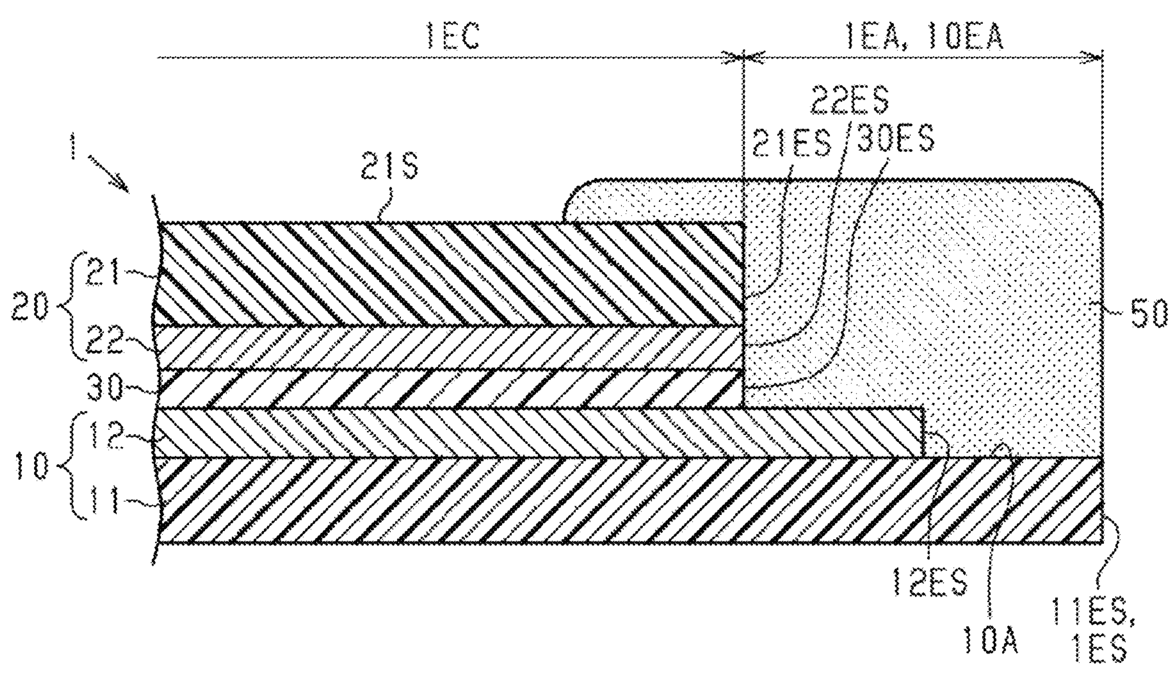
FIG. 11 is a cross-sectional view of a modification example of the cross-sectional shape illustrated in FIG. 3.
Figure 12:
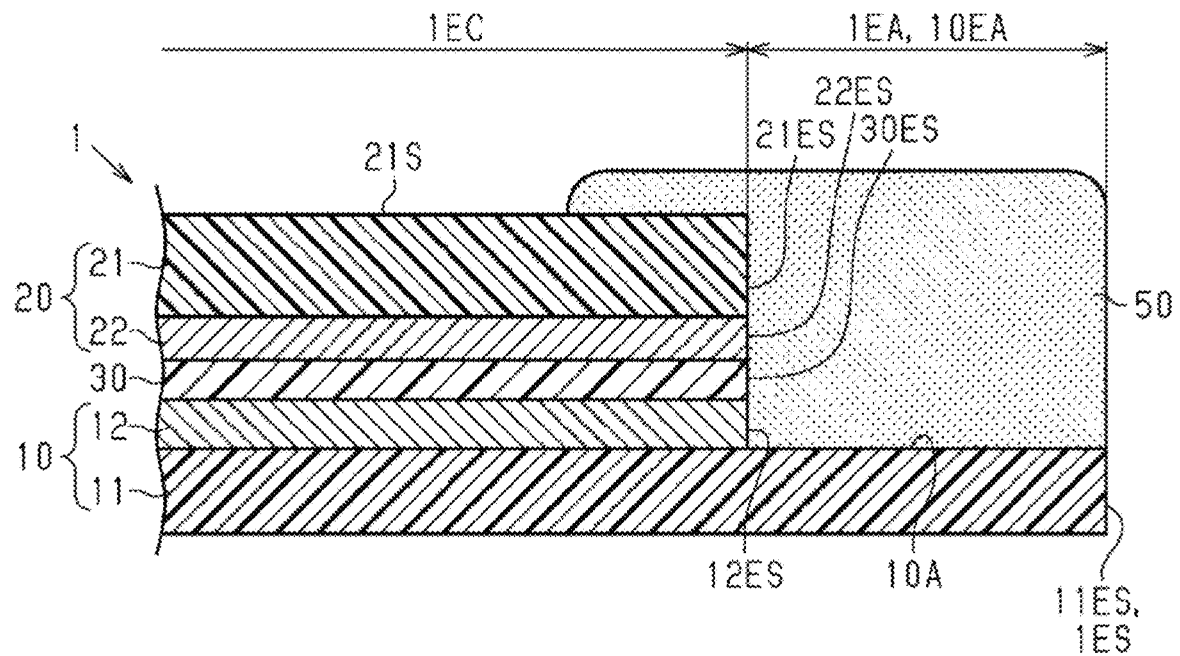
FIG. 12 is a cross-sectional view of a modification example of the cross-sectional shape illustrated in FIG. 3.

As illustrated in each of FIGS. 11 and 12, a configuration may be adopted in which the first non-electrode section 10A is positioned on the outer peripheral end face 1ES of the light control sheet 1 instead of a configuration in which the first portion 10A1 and the non-conductive section 12A are provided in the first non-driver section 10EA. For example, as illustrated in FIG. 11, the end face 12ES of the first transparent electrode layer 12 may be positioned closer to the outer peripheral end face 1ES of the light control sheet 1 than the boundary between the driver section 1EC and the first non-driver section 10EA is. That is, the end face 12ES may be positioned between the boundary and the outer peripheral end face 1ES. For example, as illustrated in FIG. 12, the end face 12ES of the first transparent electrode layer 12 may be positioned on the boundary between the driver section 1EC and the first non-driver section 10EA. Even in each of these cases, it is possible to obtain the advantage equivalent to that of 3 above. The outer peripheral end face 1ES of the light control sheet 1 may have a portion at which the non-conductive section 12A is positioned and a portion at which the first non-electrode section 10A is positioned in the first non-driver section 10EA.

The first transparent electrode layer 12 and the second transparent electrode layer 22 that are electrically connected to the driver section 1EC may be positioned on part of the outer peripheral end face 1ES of the light control sheet 1. For example, of the entire circumference of the outer peripheral end face 1ES of the light control sheet 1, only the portion that is externally exposed after the light control sheet 1 is attached to an attachment target may include any of the non-conductive section 12A, the first non-electrode section 10A, or the second non-electrode section 20A.

In one example, the region near the first terminal 12P and the second terminal 22P is covered with a sash or the like in some cases when the light control sheet 1 is attached to a window glass or the like that is an attachment target. In this case, the region near the first terminal 12P and the second terminal 22P is not exposed to the outside after the light control sheet 1 is attached to the attachment target.

Figure 13:
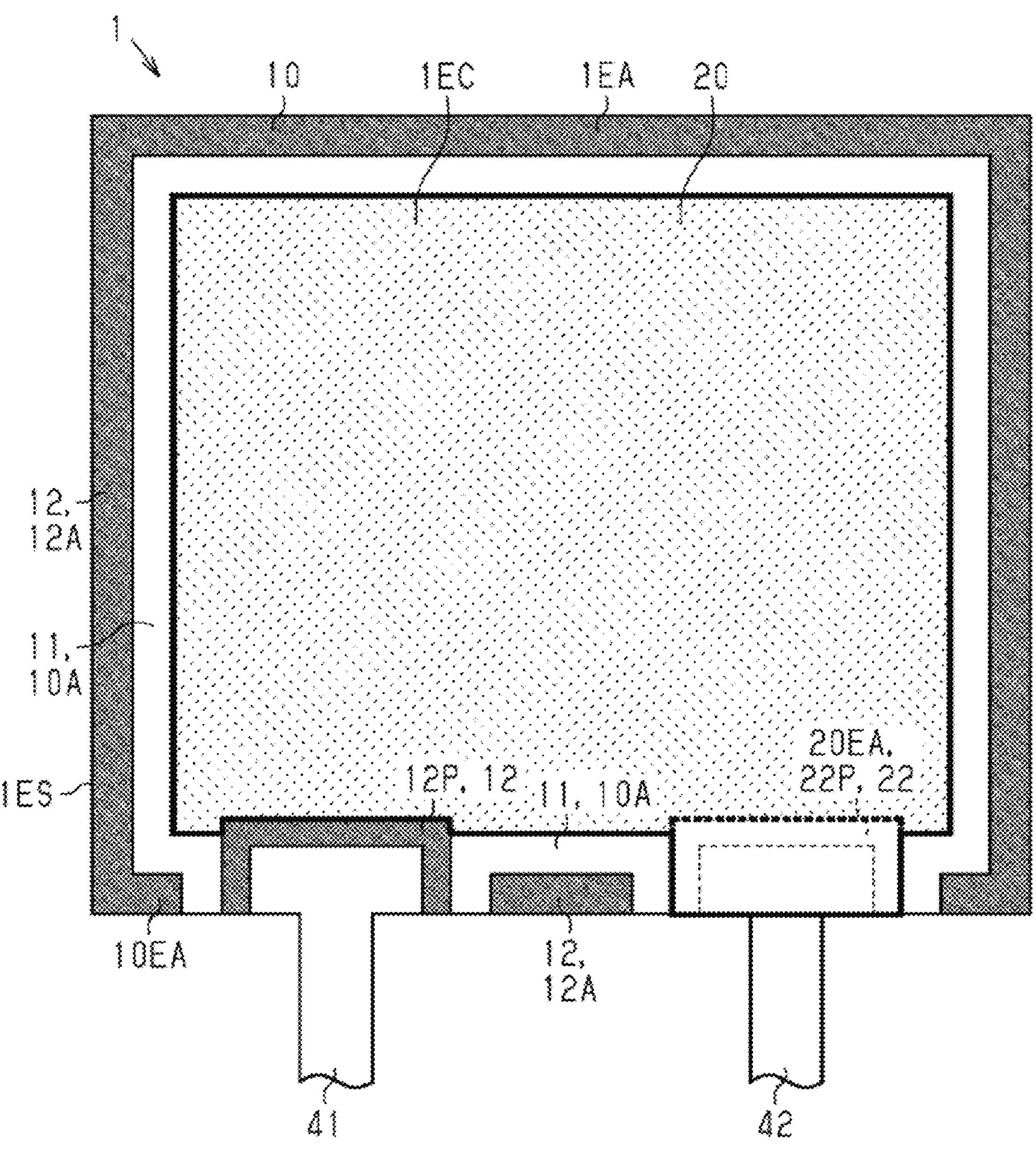
FIG. 13 is a plan view of a modification example of a shape illustrated in FIG. 1.

As illustrated in FIG. 13, for example, in a case where the region near the first terminal 12P and the second terminal 22P is covered with a different entity such as a sash after the light control sheet 1 is attached, the first terminal 12P and the second terminal 22P may be positioned on the outer peripheral end face 1ES of the light control sheet 1. In this case, the first non-electrode section 10A is configured such that the non-conductive sections 12A are positioned on the respective sides of the whole of the periphery of the outer peripheral end face 1ES of the light control sheet 1 except for the side on which the first terminal 12P and the second terminal 22P are positioned. In addition, to prevent the first terminal 12P and the second terminal 22P from being short-circuited, the first non-electrode section 10A is also disposed between the first terminal 12P and the second terminal 22P. Such a configuration makes it possible to increase the area of the driver section 1EC as compared with a configuration in which the first non-electrode section 10A and the second non-electrode section 20A are provided closer to the outer periphery than the first terminal 12P and the second terminal 22P are.

Figure 14:
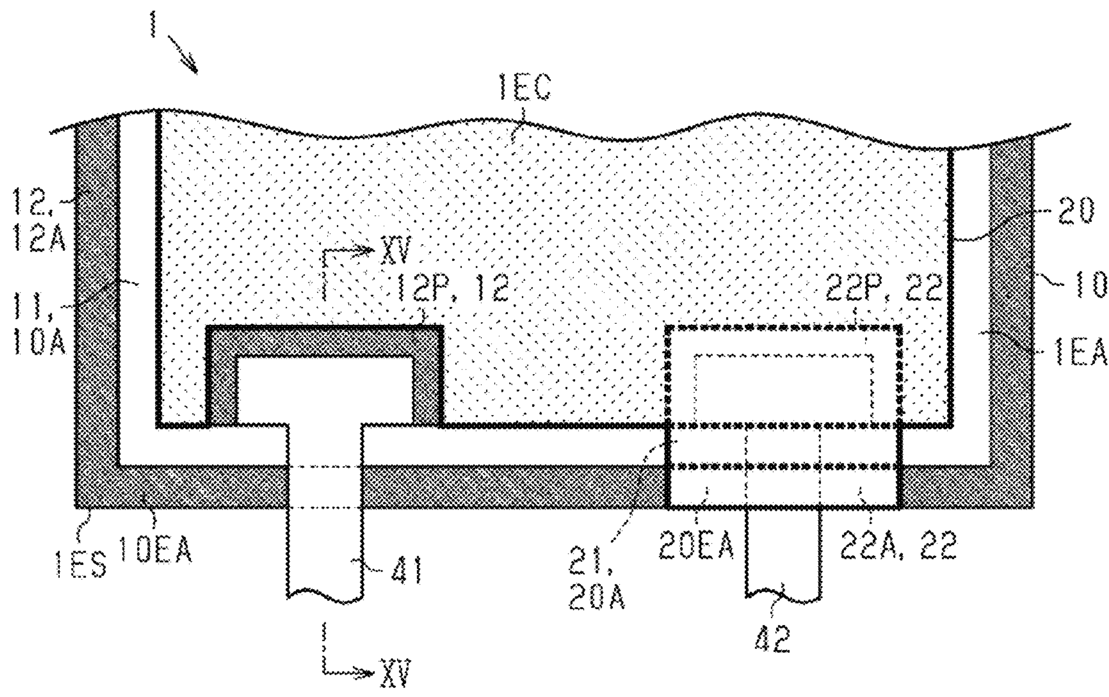
FIG. 14 is a plan view of a modification example of the shape illustrated in FIG. 1.
Figure 15:
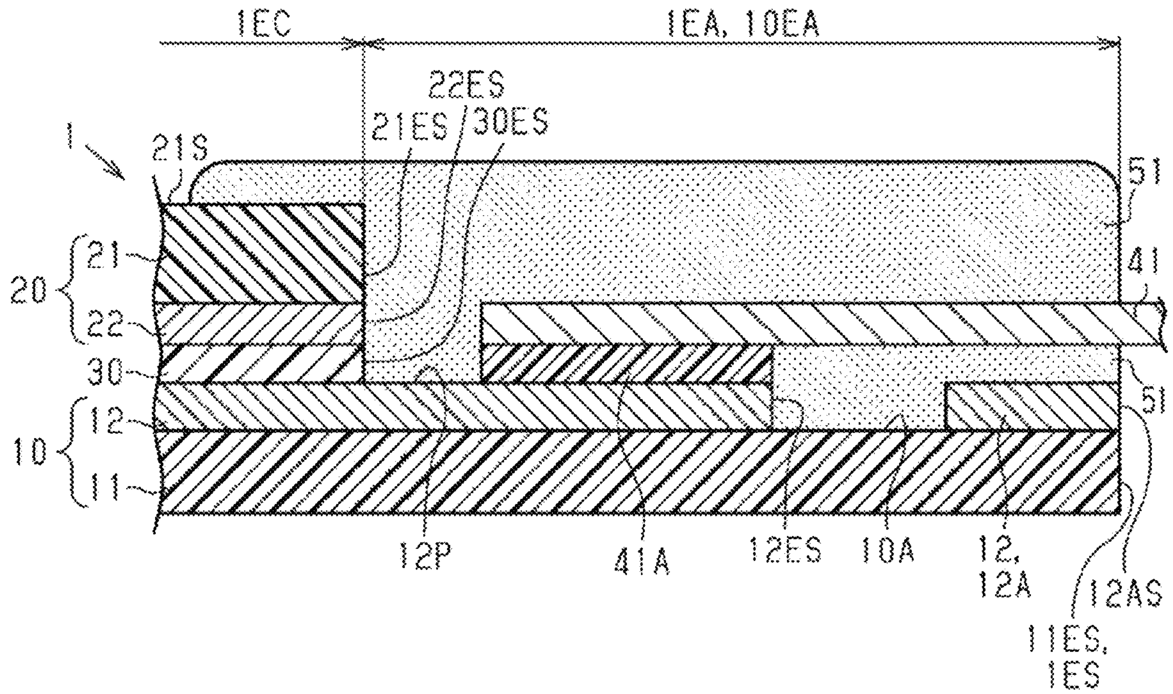
FIG. 15 is a cross-sectional view of a light control sheet taken along a line XV-XV in FIG. 14.

As illustrated in each of FIGS. 14 and 15, the non-conductive section 12A may be provided closer to the outer periphery than the first terminal 12P is. In addition, there may be provided a non-conductive section 22A inside the second terminal 22P. The non-conductive section 22A is the portion of the second transparent electrode layer 22 positioned in the second non-driver section 20EA that is not electrically connected to the second terminal 22P and the second transparent electrode layer 22 positioned in the driver section 1EC. The non-conductive section 22A is included in the outer peripheral end face 1ES of the light control sheet 1 in the second non-driver section 20EA. In the configuration illustrated in each of FIGS. 14 and 15, the non-conductive section 12A or the non-conductive section 22A is positioned over the whole of the periphery of the outer peripheral end face 1ES of the light control sheet 1.

As illustrated in FIG. 14, the first non-electrode section 10A is continuously provided to surround the driver section 1EC and the first terminal 12P in the first non-driver section 10EA. The first non-electrode section 10A defines the non-conductive section 12A in the first transparent electrode layer 12 positioned in the first non-driver section 10EA. The second non-electrode section 20A defines the second terminal 22P and the non-conductive section 22A in the second non-driver section 20EA. In this case, the second non-electrode section 20A is an example of a disconnection section that defines the non-conductive section 22A in the second transparent electrode layer 22 positioned in the second non-driver section 20EA. That is, the second non-driver section 20EA includes a disconnection section that separates the non-conductive section 22A from the second driver portion and the second terminal 22P. The first non-electrode section 10A and the second non-electrode section 20A are continuously provided inside the non-conductive section 12A and the non-conductive section 22A in plan view from a viewpoint facing the light control sheet 1.

As illustrated in FIG. 15, the portion of the first non-electrode section 10A overlapping with the first external wiring line 41 may be filled with the first terminal sealing section 51. Instead of this, the portion of the first non-electrode section 10A overlapping with the first external wiring line 41 may be filled with the insulator 60 or may be a void that is filled with none of the first terminal sealing section 51 and the insulator 60. Similarly, the second non-electrode section 20A may be filled with the second terminal sealing section 52 or the insulator 60 or may be a void that is filled with none of the second terminal sealing section 52 and the insulator 60.

The first electrode sheet 10 may include another functional layer such as an ultraviolet shielding layer, an infrared shielding layer, an alignment layer, an adhesive layer, or a protective layer. The second electrode sheet 20 may include another functional layer such as an ultraviolet shielding layer, an infrared shielding layer, an alignment layer, an adhesive layer, or a protective layer.

The light control sheet 1 is not limited to a rectangular shape and may have a geometric shape such as a polygonal shape, a circular shape, or an elliptical shape other than the rectangular shape, or an indefinite shape other than the geometric shape. The light control sheet 1 is not limited to a two-dimensional planar shape and may have a curved shape such as a cylindrical shape, a spherical shape, or a corrugated shape.

A light control sheet includes a pair of electrode sheets and a light control layer that is positioned between the pair of electrode sheets. Each of the electrode sheets includes an insulating transparent substrate and an electrically conductive transparent electrode layer. The light control layer is positioned between the transparent electrode layers of the two electrode sheets. The light control layer includes a liquid crystal composition including liquid crystal molecules. The liquid crystal molecules exhibit different alignments between a state where there is no potential difference between the pair of transparent electrode layers and a state having a potential difference between the pair of transparent electrode layers. For example, the light control sheet exhibits opacity by using the alignment of the liquid crystal molecules with no potential difference between the pair of transparent electrode layers and exhibits transparency by using the alignment of the liquid crystal molecules with a potential difference between the pair of transparent electrode layers.

To suppress the deterioration of the liquid crystal composition in the light control sheet by acid, moisture, ultraviolet rays, or the like, it is preferable to cover an end face of the light control layer with an insulating sealing section. In one example, one of the electrode sheets and the light control layer are cut in half and removed, and the sealing section is disposed to cover the end face of the light control layer on the other electrode sheet thus exposed (e.g., JP 2020-177039 A).

In the case described above, the transparent electrode layer of the electrode sheet provided with the sealing section is externally exposed at the outer peripheral end face of the light control sheet. Therefore, in a case where the pair of transparent electrode layers has a potential difference in between, the energized transparent electrode layer is exposed to the outer peripheral end face of the light control sheet.

A light control sheet according to one aspect of the present invention includes a first electrode sheet including a first transparent substrate and a first transparent electrode layer; a second electrode sheet including a second transparent substrate and a second transparent electrode layer; and a light control layer including a liquid crystal composition. The light control layer is positioned between the first transparent electrode layer and the second transparent electrode layer. In plan view from a viewpoint facing the light control sheet, a portion at which the first electrode sheet, the second electrode sheet, and the light control layer are overlaid forms a driver section, a portion of the first electrode sheet that is exposed from the light control layer and the second electrode sheet forms a first non-driver section, a portion of the second electrode sheet that is exposed from the light control layer and the first electrode sheet forms a second non-driver section, the first non-driver section and the second non-driver section are provided with a sealing section that covers an end face of the light control layer, the first transparent electrode layer includes a first terminal that is electrically connected to a first driver portion positioned in the driver section and a non-conductive section that is not electrically connected to the first driver portion in the first non-driver section, the first non-driver section includes a disconnection section that separates the non-conductive section from the first driver portion and the first terminal, the non-conductive section forms an outer peripheral end face of the light control sheet, and the second non-driver section includes a second terminal that is electrically connected to a second driver portion of the second transparent electrode layer positioned in the driver section.

A light control sheet according to another aspect of the present invention includes a first electrode sheet including a first transparent substrate and a first transparent electrode layer; a second electrode sheet including a second transparent substrate and a second transparent electrode layer; and a light control layer including a liquid crystal composition. The light control layer is positioned between the first transparent electrode layer and the second transparent electrode layer. In plan view from a viewpoint facing the light control sheet, a portion at which the first electrode sheet, the second electrode sheet, and the light control layer are overlaid forms a driver section, a portion of the first electrode sheet that is exposed from the light control layer and the second electrode sheet forms a first non-driver section, a portion of the second electrode sheet that is exposed from the light control layer and the first electrode sheet forms a second non-driver section, the first transparent electrode layer includes a first terminal that is electrically connected to a first driver portion of the first transparent electrode layer positioned in the driver section in the first non-driver section, the second transparent electrode layer includes a second terminal that is electrically connected to a second driver portion of the second transparent electrode layer positioned in the driver section in the second non-driver section, the first non-driver section and the second non-driver section are provided with an insulating sealing section that covers an end face of the light control layer, and an end face of the first transparent electrode layer is covered with the insulating sealing section at a position inside an end face of the first transparent substrate in the first non-driver section.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control sheet, comprising:

a first electrode sheet including a first transparent substrate and a first transparent electrode layer;

a second electrode sheet including a second transparent substrate and a second transparent electrode layer; and a light control layer comprising a liquid crystal composition and formed between the first transparent electrode layer and the second transparent electrode layer, wherein the first electrode sheet, the second electrode sheet, and the light control layer form a driver section in which the first electrode sheet, the second electrode sheet, and the light control layer are overlaid, a first non-driver section in which the first electrode sheet is exposed from the light control layer and the second electrode sheet, and a second non-driver section in which the second electrode sheet is exposed from the light control layer and the first electrode sheet, and wherein the first non-driver section and the second non-driver section include an insulating sealing section positioned interior to an outer surface and covering an end face of the light control layer, the first transparent electrode layer includes a first terminal and a non-conductive section in the first non-driver section such that the first terminal is configured to be electrically connected to a first driver portion positioned in the driver section and that the non-conductive section is configured to be not electrically connected to the first driver portion, the first non-driver section includes a disconnection section having at least one cut-off portion, wherein the cut-off portion separates the non-conductive section from the first driver portion and the first terminal, the non-conductive section forms an outer peripheral end face of the light control sheet, and the second non-driver section includes a second terminal configured to be electrically connected to a second driver portion of the second transparent electrode layer in the driver section.

2. The light control sheet according to claim 1, wherein the disconnection section includes the first transparent substrate and does not include the first transparent electrode layer in the first non-driver section.

3. The light control sheet according to claim 2, wherein the disconnection section is filled with an insulator.

4. The light control sheet according to claim 2, wherein the first transparent electrode layer has a void extending through the first transparent electrode layer in a thickness direction, the first transparent substrate has a recess recessed in the thickness direction, and the void and the recess form a recessed groove in the disconnection section in the thickness direction.

5. The light control sheet according to claim 3, wherein the first transparent electrode layer has a void extending through the first transparent electrode layer in a thickness direction, the first transparent substrate has a recess recessed in the thickness direction, and the void and the recess form a recessed groove in the disconnection section in the thickness direction.

6. The light control sheet according to claim 1, wherein the disconnection section is a first disconnection section of a plurality of disconnection sections formed between the driver section and the outer peripheral end face in the first non-driver section in a thickness direction.

7. The light control sheet according to claim 2, wherein the disconnection section is a first disconnection section of a plurality of disconnection sections formed between the driver section and the outer peripheral end face in the first non-driver section in a thickness direction.

8. The light control sheet according to claim 3, wherein the disconnection section is a first disconnection section of a plurality of disconnection sections formed between the driver section and the outer peripheral end face in the first non-driver section in a thickness direction.

9. The light control sheet according to claim 4, wherein the disconnection section is a first disconnection section of a plurality of disconnection sections formed between the driver section and the outer peripheral end face in the first non-driver section in a thickness direction.

10. The light control sheet according to claim 5, wherein the disconnection section is a first disconnection section of a plurality of disconnection sections formed between the driver section and the outer peripheral end face in the first non-driver section in a thickness direction.

11. The light control sheet according to claim 1, wherein the first transparent electrode layer includes a first terminal in the first non-driver section such that the first terminal is configured to be electrically connected to a first driver portion of the first transparent electrode layer in the driver section, the second transparent electrode layer includes a second terminal in the second non-driver section such that the second terminal is configured to be electrically connected to a second driver portion of the second transparent electrode layer positioned in the driver section, and the first non-driver section and the second non-driver section include an insulating sealing section covering an end face of the light control layer such that an end face of the first transparent electrode layer is covered with the insulating sealing section at a position inside an end face of the first transparent substrate in the first non-driver section.

12. A light control sheet, comprising:

a first electrode sheet including a first transparent substrate and a first transparent electrode layer;

a second electrode sheet including a second transparent substrate and a second transparent electrode layer; and a light control layer comprising a liquid crystal composition and formed between the first transparent electrode layer and the second transparent electrode layer, wherein the first electrode sheet, the second electrode sheet, and the light control layer form a driver section in which the first electrode sheet, the second electrode sheet, and the light control layer are overlaid, a first non-driver section in which the first electrode sheet is exposed from the light control layer and the second electrode sheet, and a second non-driver section in which the second electrode sheet is exposed from the light control layer and the first electrode sheet, and wherein the first non-driver section and the second non-driver section include an insulating sealing section covering an end face of the light control layer, the first transparent electrode layer includes a first terminal and a non-conductive section in the first non-driver section such that the first terminal is configured to be electrically connected to a first driver portion positioned in the driver section and that the non-conductive section is configured to be not electrically connected to the first driver portion, the first non-driver section includes a disconnection section having at least one cut-off portion, wherein the cut-off portion separates the non-conductive section from the first driver portion and the first terminal, the non-conductive section forms an outer peripheral end face of the light control sheet, and the second non-driver section includes a second terminal configured to be electrically connected to a second driver portion of the second transparent electrode layer in the driver section.

* * * * *